United States Patent [19]

Brizendine et al.

[11] Patent Number: 5,182,178
[45] Date of Patent: Jan. 26, 1993

[54] SUPPRESSION OF ELECTROLYTE LEAKAGE FROM THE TERMINAL OF A LEAD-ACID BATTERY

[75] Inventors: J. David Brizendine, Lee's Summit; John Hooke, Warrensburg, both of Mo.

[73] Assignee: Gates Energy Products, Inc., Gainesville, Fla.

[21] Appl. No.: 887,437

[22] Filed: May 21, 1992

[51] Int. Cl.⁵ .............................................. H01M 2/24
[52] U.S. Cl. ..................... 429/160; 429/185; 429/225
[58] Field of Search ............ 429/158, 160, 181, 185, 429/180, 183, 184, 225, 161

[56] References Cited

U.S. PATENT DOCUMENTS

| | | | |
|---|---|---|---|
| 4,522,899 | 6/1985 | Jllmann et al. | 429/181 |
| 4,645,725 | 2/1987 | Kump et al. | 429/179 |
| 4,701,386 | 10/1987 | Kump et al. | 429/179 |
| 4,758,482 | 7/1988 | Yamana et al. | 429/163 X |

Primary Examiner—Anthony Skapars
Attorney, Agent, or Firm—C. H. Castleman; J. L. Isaac; S. G. Austin

[57] ABSTRACT

A lead-acid cell in which insert molded lead terminal connectors are provided with a surface layer of an elastic adhesive material bonded to the connector and making sealing contact with the enshrouding plastic molding. Electrolyte creepage and corrosion is suppressed.

7 Claims, 1 Drawing Sheet

5,182,178

SUPPRESSION OF ELECTROLYTE LEAKAGE FROM THE TERMINAL OF A LEAD-ACID BATTERY

BACKGROUND OF THE INVENTION

This invention relates to lead-acid batteries and particularly to the provision of a leakage/corrosion barrier for insert molded terminals of the battery.

Sulfuric acid electrolyte readily wets the surfaces of internal lead components which are joined to the output terminals of a battery via lead connector parts insert molded within plastic partition walls (including the cover). This results in leakage at the output terminal(s) of the battery.

The foregoing leakage and corrosion problem is amplified when the battery is heat cycled, that is battery service occurs over widely varying ambient temperatures. Since the plastic materials forming the partition walls of the battery typically have a different coefficient of thermal expansion than the lead connector parts enshrouded by the plastic, there is a tendency for the plastic and lead connector parts to separate and create a void for the passage of acid electrolyte. Attempts to overcome this problem have included the provision of collars or ribs on the connector to increase the length of the interfacial path between the lead connector and enshrouding plastic, as well as the provision of an interposed layer of thermosetting resin (see U.S. Pat. No. 4,758,482 to Yamana et al.), or two layers of thermoplastic rubber and plastic materials of differing elasticities (see U.S. Pat. No. 4,522,899 to Illmann et al.). Electrolyte creepage between internal terminals of a battery in a through-the-partition connection has been suppressed by coating the intercell lead connector with a perfluoro surfactant prior to application of a surrounding plastic filler (see Japanese Patent Publication No. 58-25079 published Feb. 15, 1983).

In non-insert molded terminal constructions it has been common to use rubber O-rings or rubber undercoat layers applied to a lead post member extending through an aperture in a preformed plastic partition wall, and the use of a secondary epoxy seal, to limit electrolyte creepage (see U.S. Pat. No. 4,683,647 to Brecht et al.).

SUMMARY OF THE INVENTION

In accordance with this invention a lead-acid cell is provided having a container in which is positioned at least one positive electrode plate, a least one negative electrode plate, a separator interposed between the electrode plates, an acid electrolyte absorbed in the electrode plates and separator, and a through connector formed of lead joining the electrode plate(s) of one polarity to a terminal of the cell through a plastic partition wall portion of the container. The through connector is providing with rounded edges and is insert molded in the plastic partition wall. The lead of the connector and plastic of the partition wall have substantially different thermal coefficients of expansion, and the connector is provided on its outer surface with a layer of elastic adhesive material bonded to it, and which makes sealing contact with both the connector and the surrounding plastic partition wall. The elastic nature of the adhesive material ensures the integrity of the bond to the lead connector, and continued sealing contact with the enshrouding plastic partition wall at substantially varying ambient temperatures, to thereby suppress creepage of electrolyte along the interface between the connector and partition wall.

BRIEF DESCRIPTION OF THE DRAWINGS

Preferred embodiments of the invention will be illustrated in conjunction with the accompanying drawings, in which like numerals designate like parts, and in which.

PREFERRED EMBODIMENTS O THE INVENTION

Although the invention is broadly applicable to various types of lead-acid cells and batteries, the detailed description will apply to a normally sealed or "valve-regulated" lead-acid battery of the starved electrolyte type, in which gases generated internally namely oxygen are recombined within the battery on charge and overcharge, without significant loss of weight (electrolyte) over its useful life (see U.S. Pat. No. 3,862,861 to McClelland et al.).

Figure 1:
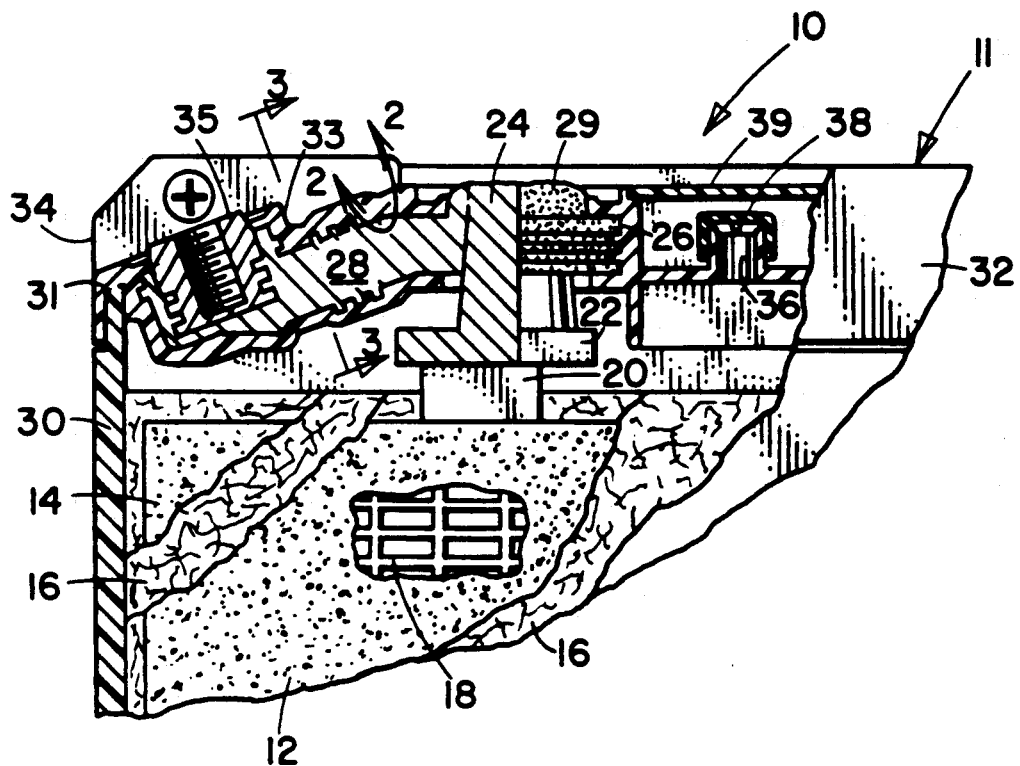
FIG. 1 is an elevational, partial sectional and broken away view of a battery and terminal construction in accordance with the invention.

Referring to FIG. 1, battery 10 is composed of a plurality of series connected cells and includes at least one porous positive electrode plate 12, porous negative electrode plate or plates 14, porous absorbent separator 16 interleaved between and pressed against the opposite polarity plates, and a sulfuric acid electrolyte absorbed within the porous plates and separator. Preferably the plates are formed of lead grids 18 on which the active material of the plate is affixed by pasting, and the grid substrate is preferably provided with integral current collector tabs 20 joined together by the cast-on-strap process to form strap 22. Integral post 24 protrudes from strap 22 and is pillar shaped to matingly fit in lead bushing portion 26 of the terminal connector shown generally at 28. The lead utilized in the grid substrate 18 and tab 20, connecting strap 22 and post 24, and terminal connector 28 is preferably of high hydrogen overvoltage e.g. pure lead or suitable alloy material, most preferably a lead-tin alloy having a tin content from about 0.3 to about 3.0 weight percent. The acid electrolyte used in the battery normally readily wets and normally creeps along the surface of these lead components, particularly along lead oxide films which are naturally present on the surface of the component parts.

The components of the battery are housed within container 11. The container generally comprises a standard open-mouthed jar 30 to which is affixed, by heat sealing, or by an adhesive or the like, inner lid member 32. The inner lid is a fairly complex molded part equipped with handle openings 34 for lifting the battery, vent openings 36 closed with bunsen resealable valves 38 to permit gas release if the internal pressure of the battery exceeds a predetermined threshold, and enshrouding portion 33 which has been molded about terminal connector 28 and bushing 26. The entire inner lid 32 is desirably formed by injection molding a suitable engineering plastic material which is resistant to sulfuric acid, including such materials as Noryl ® (polyphenylene oxide), ABS, polypropylene, and the like. An intermediate cover 39 is positioned over the bunsen valve(s), and may incorporate a flash arrestor (not shown). Desirably an outer, cosmetic top (not shown) is snap fitted over inner top 32 to cover the connection formed by joining lead post 24 and bushing 26, as well as bunsen valve 38, in customary manner.

Figure 2:
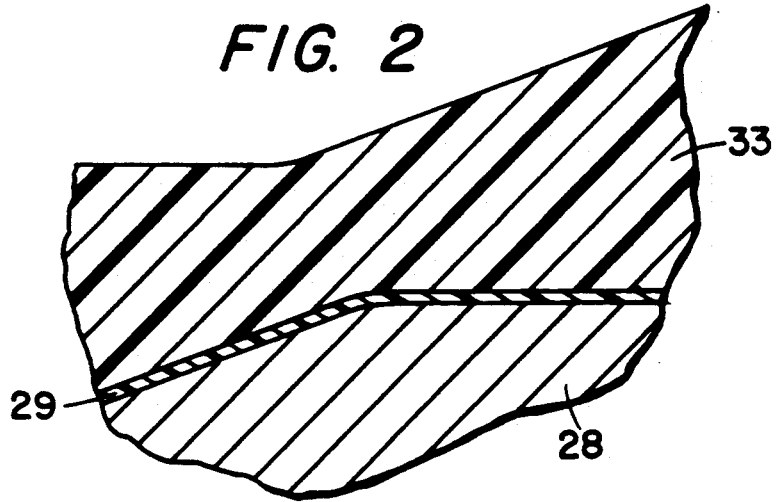
FIG. 2 is a magnified view along 2—2 of FIG. 1.

In accordance with the invention concentrically ribbed lead connector 28 and integral concentrically ribbed bushing portion 26 are provided on their outer surface with a layer of elastic adhesive material 29, shown magnified in FIG. 2 as a distinct layer, interposed between connector 28 and the encapsulating layer of plastic 33 of the inner molded lid member, and illustratively as dots on the outer surface of bushing 26 in FIG. 1. By an "elastic adhesive" material is meant a material that forms a bond (believed to be a chemical bond) with the outer surface of connector 28, and which also makes sealing contact with the surrounding plastic partition wall 38 and which exhibits an elastic property. Accordingly, during thermal cycling when plastic wall portion 33 and lead connector 28 are experiencing different rates of expansion so as to undergo relative displacement one with respect to the other, adhesive layer 29 elastically expands or contracts to maintain sealing contact between each of the connector member 28 and plastic partition wall 33. This ensures any increase in the gap between members 28 and 33 will be filled with the elastic adhesive material 29 to suppress creepage of electrolyte along the interface defined between the connector and partition wall.

Further, it is believed that the bond that is formed between the elastic adhesive material 29 and connector 28 creates at least a physical barrier inhibiting the normal reaction of the acid electrolyte with the lead oxide film formed on the surface of lead connector 28. Hence, electrolyte creepage along such interface is retarded. The result is that the positive output pole or terminal 35, formed of a threaded brass insert embedded in connector 28, and partition wall 33, is acid and corrosion free. In like manner, an internal intercell connection between the opposite polarity electrode of the cell (in this case the negative terminal), with the internal positive terminal of an adjoining cell, may also be made corrosion free with suppression of electrolyte creep along such intercell connector (by similarly coating the intercell connector with an elastic adhesive layer 29, and insert molding the coated connector in a suitable plastic shroud in a through-the-partition or over-the-partition intercell connection, for instance).

The preferred elastic adhesive coating materials 29 are resinous materials which have the capability to bond to at least the lead connector member 28, in addition to having elastomeric-like properties to permit alternate stretching and limited compression during thermal cycling. For instance, a typical lead-tin alloy used for connector 28 (and integral bushing 26) has a coefficient of thermal expansion of about $1.5 \times 10^{-5}$ in/in/° F. Typical plastic materials (e.g. Noryl) used for partition wall 33 of the inner lid have a coefficient of thermal expansion of about $4 \times 10^{-5}$ in/in/° F., i.e. a thermal expansion coefficient of more than three times that of the inserted lead connector. A sufficiently thick layer 29 of the elastic adhesive material is applied to ensure sealing contact with both the connector 28 and plastic partition 33 during anticipated temperature extremes encountered in use of the battery.

Elastic adhesive materials 29 which have been found suitable for use in the invention include one part or two-part polyurethane elastomers, formed from suitable isocyanate and active hydrogen supplying monomers or blocked polymers. One elastic adhesive that has been found especially useful is sold under the trade name CHEMLOK ® EP4802-75 TPE adhesive (Lord Corporation, Elastomer Products Division). This material is formed from an adhesive component having a viscosity of 1,000 cps at 100° F., and non-volatile content of 18 percent, a weight/gallon of 7.5 lbs., a flash point of 41° F., and which may be diluted in toluene, xylene, or methylethyl ketone. The second, curing agent component for the adhesive is sold under the trade name CHEMLOK ® EP4802-69S and has a total solids content of 50 percent, a weight/gallon of 11.2 lbs., a rapid cure rate, and a flash point exceeding 200° F. Another class of elastic adhesive coating materials which has been found suitable are various polysilane-containing elastomers, preferably polysilane-containing urethane elastomers such as CHEMLOK ®487 (Lord Corporation).

Various other adhesives, which do not have the elastic and bonding properties of the materials of the invention, were tested to determine the corrosion and creepage resistance imparted to the insert molded connector member 28. The materials tested included epoxy adhesives, polyamide hot melts, asphalts, rigid urethanes, cyanoacrylates, and Oppanol (the trade name for a gum based material, apparently having elastic properties but believed not to form a chemical bond with the underlying lead connector member 28). None of these materials were fully effective in suppressing electrolyte creepage or corrosion along the interface between connector member 28 and plastic partition 33 (corrosion was in evidence at terminal 35).

Figure 3:
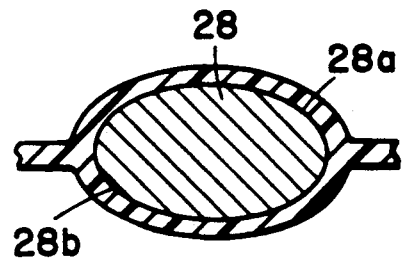
FIG. 3 is a sectional view taken along 3—3 of FIG. 1.

It has also been found that the geometry of insert member 28 is critical. As shown in FIG. 3, terminal connector 28 in cross-section has rounded edges 28a, 28b. When the same elastic adhesives of the invention were applied to a lead connector 28 having sharp cornered, squared edges, for some reason not fully understood there was significant electrolyte creepage along the lead/plastic interface, despite the presence of layer 29 of the preferred elastic adhesive material. It is believed that with rounded parts there is a residual stress, after molding and subsequent shrinkage of the plastic material 32, which is more uniformly distributed and applied to the underlying lead connector member 28. Preferred cross-sectional shapes for connector 28 include circular, oval and elliptical, with circular and elliptical being most preferred. On the other hand, when the preferred configuration of connector 28 was employed having rounded corners was tested for electrolyte creepage resistance, with layer 29 of elastic adhesive material omitted, there was substantial creepage of electrolyte along the connector/partition wall interface, particularly during thermal cycling.

The terminal connector 28 of the invention may be produced by the following method. If it is desired to employ a high conductivity, relatively hard metal insert 35 in the connector, a suitable grooved hexagonal threaded brass insert connector 35 may be insert molded in one end of lead connector 28, opposite bushing portion 26. This lead connector/bushing with brass insert is then provided with a layer of the elastic adhesive material 29 on the lead portions of its outer surface, such as by dipping, spraying, painting or the like. For this purpose the elastic adhesive material may be diluted in a suitable solvent, such as toluene, or the viscosity may be controlled by temperature rather than by using a diluting solvent. Although a single dipping or brushing of the part in the solution of elastic adhesive may be adequate, additional passes may be desirable to achieve adequate thickness of the elastic adhesive layer. Sufficient thickness should result to impart the elasticity required to compensate for relative expansion of the parts during thermal cycling at anticipated temperature extremes. A preferred thickness of layer 29 is from about 0.004 to about 0.020 inches, more preferably from about 0.006 to about 0.015 inches.

After the connector 28 and bushing 26 have been coated on their surface with layer 29, the part is inserted in an appropriately configured mold to mold inner cover 32 about the inserted part 28, 26. It is preferred to mold the plastic partition wall material 32, 33 about the inserted coated lead part preferably by injection molding at a temperature and a pressure such that, upon subsequent cooling and shrinkage of the plastic material, it has a residual stress in the range (calculated) preferably from about 3,000-5,000 psi. It places the elastic adhesive layer, which acts as a cushion, in compression at room (and elevated) temperatures. The plastic component, after molding (and shrinkage) compresses the elastic sealant 29 firmly against the outer surface of lead connector 28, 26, helping to enhance the bond formed therebetween and densifying the porous lead oxide film existing at the surface. Typically the thickness of wall 33 is preferably from about 0.075 to about 0.25 inches, more preferably from about 0.1 to about 0.18 inches.

Further assembly operations are standard and include installing the thus insert molded lid 32 to jar container 30 and joining the two together, such as by a secondary adhesive at joint 31, and by welding post 24 to the closely surrounding bushing 26. Should this welding operation serve to disrupt a portion of the bonding layer 29 surrounding lead connector 28, through heat (annealing) generated during the welding, a secondary sealing application of UV cured acrylic, or epoxy about the top portion of the thus formed welded joint between post 24 and bushing 29 may be effected.

While certain representative embodiments and details have been shown for the purpose of illustrating the invention, it will be apparent to those skilled in this art that various changes and modifications may be made therein without departing from the spirit or scope of the invention. The invention illustratively disclosed herein suitably may be practiced in the absence of any element which is not specifically disclosed herein.

What is claimed is:

1. In a lead-acid cell having a container in which is positioned at least one positive electrode plate, at least one negative electrode plate, a separator interposed between the electrode plates, an acid electrolyte absorbed in the electrode plates and separator, and a through connector formed of lead joining the electrode plate(s) of one polarity to a terminal of the cell through a plastic partition wall portion of the container, the improvement comprising:

the through connector has rounded edges and is insert molded in the plastic partition wall, the lead of the connector and plastic of the partition wall having substantially different thermal coefficients of expansion, and the connector is provided on its outer surface with a layer of elastic adhesive material bonded thereto and which makes sealing contact with both the connector and the surrounding plastic partition wall at substantially varying ambient temperatures, and which suppresses creepage of electrolyte along the interface defined between the connector and partition wall.

2. The cell of claim 1 wherein the elastic adhesive material is a polyurethane elastomer.

3. The cell of claim 1 wherein the elastic adhesive material is a polysilane-containing elastomer.

4. The cell of claim 1 wherein the thermal coefficient of expansion of the plastic partition wall is at least about three times that of the lead of the connector.

5. The cell of claim 1 wherein the cross-sectional shape of the connector is generally elliptical.

6. The cell of claim 5 wherein the connector is provided on its outer surface with a plurality of concentric ribs.

7. The cell of claim 1 wherein the layer of elastic adhesive material has a thickness of from about 0.004 to about 0.020 inches.

* * * * *